United States Patent Office 3,228,314
Patented Jan. 11, 1966

3,228,314
PHOTOGRAPHIC CAMERA, OBJECTIVE OR SHUTTER WITH AUTOMATIC FLASH EXPOSURE MECHANISM
Heinz Köppen, Stuttgart, Germany, assignor to Zeiss Ikon Aktiengesellschaft, Stuttgart, Germany
Filed July 11, 1963, Ser. No. 294,385
Claims priority, application Germany, July 21, 1962,
Z 9,549
8 Claims. (Cl. 95—11.5)

This invention relates to improvements in photographic cameras, objectives or shutters which are provided with an automatic flash exposure mechanism.

Photographic cameras, objectives and shutters, respectively, are known which are provided with several operating ranges, such as a flash exposure range, an operating range for a manual adjustment or a preselection of the diaphragm, an operating range for an automatic adjustment of the diaphragm, and which as a further improvement are also provided with an automatic flash exposure mechanism by means of which the diaphragm aperture is formed automatically in dependence of the adjusted guide number and distance values so that the camera user is relieved of any photographic calculations.

For the purpose of adjusting the camera to the different operating ranges, there is provided a so called actuating ring on which are arranged the guide number scale for the flash exposure range and the diaphragm scale for the manual setting of the diaphragm and, furthermore, a mark for the operating range of the automatic flash exposure. The aforementioned guide number scale and the diaphragm scale are positioned opposite a stationary index. The distance adjusting ring expediently is so arranged that its distance scale values may be positioned opposite the same stationary index. In order to assure the formation of the correct diaphragm aperture in each individual operating range, there are provided pivotally mounted intermediate transfer elements which are arranged between the actuating ring and the distance adjusting ring, or between the scanning device for the pointer of the exposure meter and the diaphragm cage, respectively. These intermediate transfer elements combine and store the adjusted guide number and distance values, and the exposure value respectively, and feed these values to the diaphragm mechanism, as the case may be either in automatic diaphragms or in manually adjustable diaphragms, by direct engagement of the diaphragm control ring, or by arresting the rotation of the latter when it has been set into a reverse motion by the release of the camera.

The intermediate transfer elements consist preferably of pivotally mounted levers which are deflected by parts of the adjusting rings or the scanning device of the exposure meter, and these deflections by means of a coupling or abutment connection are transferred to the diaphragm mechanism. The mentioned influencing parts of the adjusting rings for the guide number and the distance consist of deflection or control cams, respectively, which are provided on the inner sides of the rings and which are engaged at one of their ends by the intermediate transfer levers (scanning levers). The deflections of these scanning levers are transferred to the diaphragm mechanism for the purpose of forming the diaphragm aperture in the following manner:

In manual diaphragm aperture formation the aforementioned deflections of the scanning levers are transferred to an abutment or the like which is in direct association with the diaphragm mechanism, while in automatic diaphragms these deflections adjust one or more influencing elements which when the camera is tensioned have no connection with the diaphragm mechanism. Only when the camera is released, a path compensator is set into operation which determines the length of the reverse motion of the released diaphragm control ring (diaphragm cage) and which consists substantially of a tooth-like formation of the influencing element and a series of steps arranged on the rotatable diaphragm cage and cooperating with said tooth-like influencing element. Depending upon the position of the influencing element with respect to the series of abutment steps, the rotatable diaphragm cage upon release of the camera is able to perform a shorter or longer return run toward an extreme diaphragm aperture before it comes to an engagement between the abutment tooth and the abutment steps and therewith to a stop of the diaphragm cage.

The control cam on the distance adjusting ring is shaped in such a manner that it is able to offset the different characteristics in the adjustment movements of the distance adjusting mechanism on the one hand and of the diaphragm mechanism on the other hand.

The actuating ring serving to set into operation and to shut off, respectively, the individual operating ranges is provided on its inner circumference with connecting and disconnecting cams; depending upon the operating range selected the scanning levers of the automatic exposure mechanisms, which are in engagement with said cams, in this manner are set to work and disconnected, respectively. For the initiating and the blocking, respectively, of the scanning motions of the pointer of the measuring instrument with respect to the diaphragm mechanism, which takes place in the same way, there is provided a special control element.

For the operation of the automatic exposure mechanism, i.e. for the introduction of the scanning positions of the pointer of the measuring instrument into the diaphragm mechanism, there is provided either a special catch member and a separate series of abutment steps on one of the rotatable diaphragm cages, or else merely a special catch member which collaborates with a series of abutment steps which are arranged on one of the rotatable diaphragm cages and are common to both automatic exposure mechanisms.

In all the photographic devices known heretofore it was not possible to simultaneously employ a coupled range finder or an interchangeable lens system in combination with an automatic flash exposure mechanism.

It is an object of the invention to provide a camera which is equipped not only with an operating range for automatic flash exposures and one or more other operating ranges, such as one for an automatic and one for a manual setting of the diaphragm, but also with a wholly or partially interchangeable lens system and with a gear connection of the distance adjusting and reading member, engaging the automatic flash exposure mechanism on one hand and the built-in range finder on the other hand.

The arrangement made in connection with interchangeable partial lens systems preferably is such that together with the partial lens system and the distance adjusting and reading means connected therewith, there is exchanged only the means for introducing the adjusted distance values into the automatic flash exposure mechanism and into the range finder, respectively.

This means consists substantially of a lifting cam which in its deflection shape may be provided also with some compensation for the uneven gradations of the distance scale and diaphragm scale.

In lens system to be exchanged as a whole the invention provides for an exchange of the entire automatic flash exposure mechanism including the actuating ring so that only the scanning end of the angular lever carrying the movable distance reading means of the range finder projects from the camera body.

With these and other objects in view, the invention will now be described in more detail with reference to the accompanying drawings which illustrate several embodiments of the invention.

Figure 1:
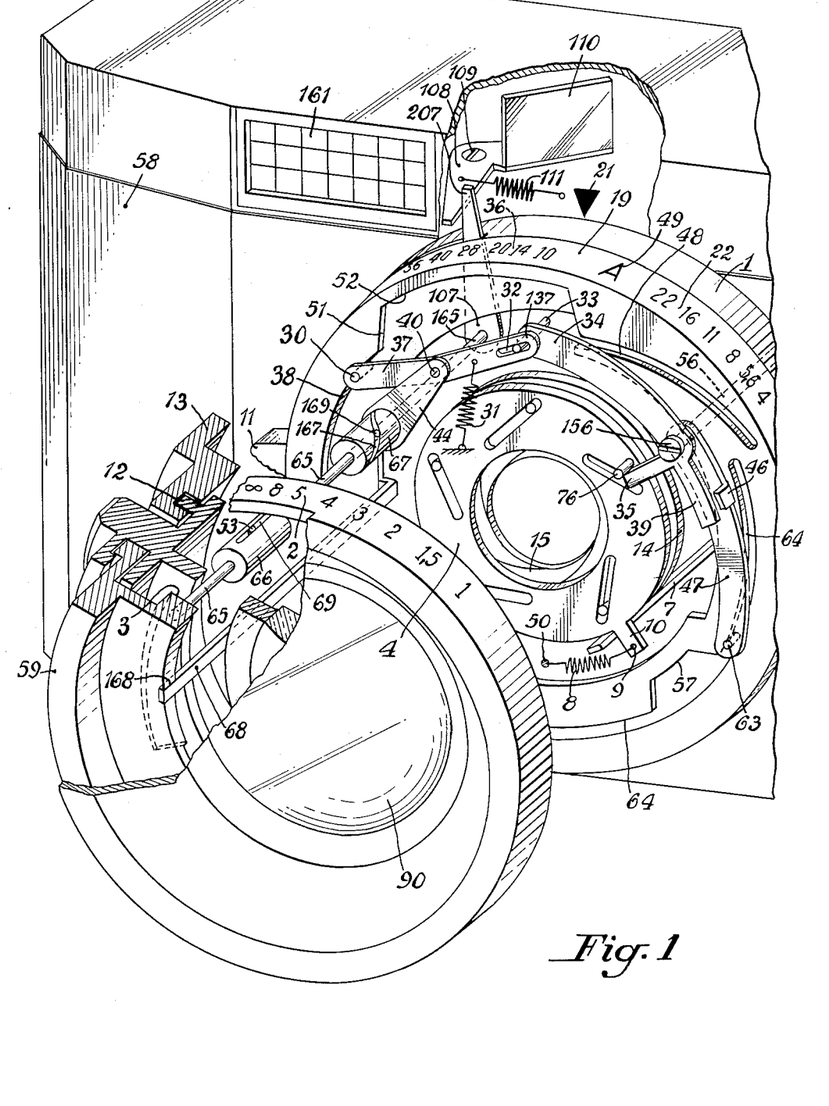
FIG. 1 illustrates a camera of the invention whose objective is provided with an exchangeable front lens.

Referring to FIG. 1, the exchangeable optical member 90 may consist of a front lens fixedly arranged in a mount which is supported by an annular portion 13 of the camera casing and is provided with bayonet projections 12. This annular portion 13 is surrounded by a distance scale ring 59 provided with a distance scale 2. The distance scale ring 59 has arranged on its front face turned toward the camera body an axially projecting distance deflection cam 3 which is engaged by an axially extending deflecting pin 65.

The distance deflection cam 3 is so shaped and adjusted to the distance values that with decreasing distance values it protrudes progressively more and more toward the camera body. This has the result that when small distance values are adjusted the scanning pin 65 is moved in the direction toward the camera.

Besides the scanning pin 65 there protrudes from the camera also an axially positioned transmission rod 68 which engages a recess 168 provided in the distance scale ring 59. This transmission rod 68 is connected with the distance adjustment ring 1 arranged on the camera and carrying the adjusting handles 11 and assures a synchronism between the rings 1 and 59.

The distance scanning pin 65 is connected with a distance scanning lever provided on the camera by means of two axially aligned sleeve guides 66, 53, 69 and 67, 167, 169. The first named guide sleeve 66 is stationary and is provided with a slot 69 parallel to the optical axis, in which slot is guided a pin 53 mounted transversely on the distance scanning pin 65. The second guide sleeve 67 is fixedly connected on one end of the scanning lever 44 and is provided with a helical groove 167 into which extends the pin 169 likewise attached transversely to the distance scanning pin 65. It is apparent that with a displacement of the scanning pin 65 in the direction toward the camera the sleeve 67 and therewith the scanning lever 44 perform a clockwise rotation, and that a displacement of the scanning pin 65 in the direction toward the front lens results in a counterclockwise rotation of the sleeve 67 and the lever 44.

In addition to the already mentioned distance adjusting ring 1 the camera is also provided with a diaphragm mechanism which is connected with the stationary lens system and comprises a stationary diaphragm cage 14, a rotatable diaphragm cage 4 and the diaphragm segments 15, and the actuating ring 19 which carries the various scales and marks required for the individual operating ranges. Also not exchanged are—when the front lens is exchanged—the deflection, scanning and adjusting members of the automatic flash exposure mechanism, which will be described in more detail later on.

The camera is provided with three adjustable operating ranges, namely one for the automatic flash exposure mechanism, one for the automatic exposure mechanism, and one for the manual diaphragm aperture formation. Consequently, the actuating ring 19 has a guide number scale 36, a mark "A" designated with 49 for the adjustment of the range of the automatic exposure mechanism, and a diaphragm scale 22 for the manual selection of the diaphragm aperture. The registration of these three ranges takes place with a stationary index 21 which is also used for the reading of the distance values.

The actuating ring 19 is provided at its inner circumference with the following deflection, disconnecting and connecting means: First, a deflection cam 38, viewed from above, springs back toward the outer circumference of the ring 19 when higher guide numbers are adjusted and is shaped to conform to the values of the guide number scale. Then follows a disconnecting cam 51 which has a higher pitch and converges with a part 52 concentric to the optical axis. This portion 52 is followed by a deflection cam 48 for the manual diaphragm aperture formation. This last mentioned cam is shaped in such a manner that it begins with a protruding portion which corresponds to the smallest diaphragm aperture $f:22$ and terminates in a portion which recedes farthest toward the outer circumference of the ring 19 and corresponds to the largest diaphragm aperture.

Next may be mentioned the course of a cam 64 which after passing a recess 57 regains its original height. This cam 64 constitutes the disconnecting cam for the scanning member 63 of the range of the automatic exposure mechanism, while the recess 57 constitutes the connecting cam for this scanning member.

Between the actuating ring 19 or the scanning device for the automatic exposure mechanism, respectively, and the distance scale ring 59 on the one hand and the diaphragm mechanism on the other hand are provided intermediate or transfer members which are adjustable in their rotative positions and are able to store the adjusted values of guide number, distance and diaphragm aperture and to transfer the same to the diaphragm mechanism. For scanning and storing of the guide number values there is provided a scanning lever 37 which engages the deflection cam 38 by means of a scanning pin 30 attached to one of its ends and which is pretensioned by a spring 31. The lever 37 in its extreme position corresponds to the adjusted guide number 10; if higher guide numbers are adjusted, the lever 37, since the cam 38 recedes more and more, performs a clockwise rotation which has the result that the other lever end 137 moves more and more downwardly.

The scanning of the adjusted distance is transferred to this guide number scanning lever 37 by means of the scanning pin 65, the sleeves 66, 67, the scanning lever 44 and the pivot point 40. The scanning device 44, 65 is pulled by the same spring 31 which influences the scanning lever 37, toward the deflection cam 3. The lever 44 is mounted to the scanning lever 37 at 40 so that the deflection movements of the lever 44 are transferred to the lever 37. The pin 65 serves at the same time as the stationary axis of rotation for this lever system. It will be noted that the deflection movements of the lever 37 are superimposed by those of the distance scanning device 65, 44 so that the lever end 137 combines in itself the sum or the difference, respectively, of all deflections caused by the adjustments of the guide numbers and the distances. It has previously been pointed out that the adjustment to higher guide numbers causes a downward movement of the lever end 137; it may be added that also the adjustment of smaller distance values results in a downward movement of the lever end 137. Accordingly, the adjustment to lower guide numbers and higher distance values effects an opposite, namely upward movement of the lever end 137 which in view of the guide numbers, however, is no longer possible in the example shown.

The scanning member for the manual diaphragm adjustment is formed by the lever 34 which is provided at its upper end with a pin 33 protruding from both sides of the lever 34. At its lower end the lever 34 is provided with a stop arm 35. The scanning lever 34 in the shape of a bell crank lever is held between its ends by a screw 156 and is loosely rotatable about an axis formed by the shaft 56. It is therefore able to store the deflections forced upon it by the scanning lever 37 as well as the control movements of the deflection cam 48 and to transfer the same to the diaphragm mechanism. In order that the scanning lever 34 may store the control movements of the scanning lever 37, these two parts are coupled by means of the pin-slot connection 33, 32. The lever 34 comes into engagement with the rotatable diaphragm cage 4 by means of the stops 35 and 76 when the camera is released.

Furthermore, the lever 34 is also connected with the lever 47 for the automatic exposure mechanism by means of its lower projection 39 which engages an abutment plate 46 provided on the lever 47. This lever 47 is fixedly mounted on the control shaft 56 which receives its control movements from the scanning device in accordance with the position of the pointer of the electrical measuring instrument of the exposure meter. Since the exposure meter along with its scanning device does not constitute an immediate part of the invention and is known per se, it is not shown in FIG. 1.

The lever 47 for the automatic exposure mechanism serves substantially for the only purpose of limiting the control movements of the shaft 56 when the operating range of the automatic exposure mechanism is employed. For this purpose the lever 47 is provided at its lower end with a scanning pin 63 cooperating with the disconnecting cams 64 and the connecting recess 57, and at its other end with the already mentioned coupling connection 39, 46. In the illustrated position of the actuating ring 19, which corresponds to the operating range of the automatic flash exposure mechanism, the automatic exposure mechanism has to be rendered ineffective. This is accomplished by the scanning pin 63 taking its position upon the disconnecting cam 64. Only after the camera has been switched from the operating range of the automatic flash exposure mechanism to the range of the automatic exposure mechanism by means of a counterclockwise rotation of the actuating ring 19 until the mark "A" 49 and the index 21 are opposite each other, the scanning pin 63 drops into the recess 57 which is of such a depth that the lever 34 and therewith the control shaft 46 can freely follow even the widest control movements of the pointer scanning device. With 58 is designated the schematically illustrated camera body on or in which are arranged the automatic exposure mechanisms described, and 161 indicates the photoelectric cell required for the operating range of the automatic exposure mechanism.

When the shutter is tensioned, the rotatable diaphragm cage 4 is in a position corresponding to the largest possible diaphragm aperture. In this position the diaphragm cage 4 is arrested by means of a shutter controlled locking member 7 which engages a radial projection 10 on the diaphragm cage 4. Upon release of the camera the locking member 7 springs into an ineffective position, whereby the diaphragm cage 4, in view of the tension of a spring 8 attached between a point 9 on the projection 10 and the stationary point 50, is permitted to run off clockwise and in the direction of a decrease of the diaphragm aperture until the stop pin 76 and the control arm 35 come into engagement with each other.

For the purpose of transferring the deflection of the scanning pin 65 to the movable deflecting member (mirror) 110 of the range finder, the sleeve 67 is provided with an extension 165 which on its end carries the transmission lever 107 protruding upwardly into the upper portion of the camera body. The upper end 207 of the transmission lever 107 engages the free end of a bell crank lever 108 which carries at its other end the movable range finder mirror 110 and, being pivotal about the shaft 109, is pulled toward the lever end 207 by a spring 111. It is apparent from this disclosure that when small distance values are adjusted the scanning pin 65 projects into the range of portions of the cam 3 which protrude more toward the interior of the camera so that the sleeve 67 is rotated clockwise. This has the result that the transmission lever 107 swings to the right and the bell crank lever 108 including the reflecting mirror 110 rotates counterclockwise. An adjustment to increased distance values causes reversely directed motions.

The remaining parts of the range finder and the view finder are not disclosed since they are commonly known.

The operation of this arrangement shown in FIG. 1 is as follows:

If a smaller distance value is adjusted in combination with the selected guide number 10, the lever 44 on account of the receding deflection cam 3 rotates clockwise so that the guide number scanning lever 37 in view of its connection at 40 performs likewise a clockwise rotation. This has the effect that the upper lever end 137 moves downwardly, i.e. toward the optical axis and presses in view of the coupling 32, 33 upon the adjacent end of the scanning lever 34 for the manual diaphragm adjustment. This lever 34 is at present rendered inoperative with respect to its own scanning motions. It will be rendered operative only when upon a corresponding adjustment of the actuating ring 19 its scanning pin 33 comes into engagement with the deflection cam 48. In the illustrated adjustment to the range of the automatic flash exposure mechanism the lever 34 acts merely as a transfer member for transferring the deflections of the lever 37 to the diaphragm mechanism. The downward displacement of the lever end 34 carrying the coupling pin 33 results in a counterclockwise rotation of the scanning lever 34 about the axis of the shaft 56. This means that the stop 35 of the lever 34 swings outwardly whereby the stop 35 moves away from the counter stop 76 provided on the diaphragm cage 4. The result is that the diaphragm cage 4 upon release of the camera performs a closing movement which causes a closing of the diaphragm segments by a certain degree. If, for instance, the distance adjusting ring has been set to the value of 1 meter instead of to 5 meters, as shown, a diaphragm aperture $f{:}10$ is formed automatically upon release of the camera according to the known relation:

$$\text{diaphragm aperture} = \text{guide member} : \text{distance}$$

This means that the diaphragm has been closed by almost five intervals.

The same effect occurs when the guide number ring is adjusted to a higher guide number instead of to the lowest guide number 10, as illustrated. The scanning lever 37 then pivots clockwise, since the guide number cam 38 in proportion to the adjusted higher guide numbers recedes increasingly toward the outer circumfrenece of the ring 19 so that the lever end 137 again moves downwardly toward the optical axis. Upon release of the camera the diaphragm will now likewise be closed down by a corresponding number of diaphragm intervals.

Instead of to the operating range of the automatic flash exposure mechanism, the camera may now be adjusted to the operating range of the automatic exposure mechanism by bringing the mark "A" and the index 21 into opposition. After a rotation of the actuating ring 19 in counterclockwise direction, the pin 30 arranged on the scanning lever 37 moves into the region of the disconnecting cam 51 and subsequently into that of the recess 52 whereby the support for the scanning pin 30 is dispensed with. The lever 37 is freely movable and the control movements coming from the distance deflection cam 3 no longer have any effect on the lever 34.

When moving the mark "A" opposite the index 21, the scanning pin 63 leaves the disconnecting cam 64 and is positioned opposite the connecting recess 57. The result is that the shaft 56 is permitted to impart its rotative control motions via the coupling connection 39, 46 to the scanning lever 34 and herewith via the abutment connection 35, 76 to the diaphragm mechanism.

Finally, if for the operation of the camera the range of the manual diaphragm adjustment is selected, the scanning pin 33 on the lever 34 as a result of the opposing position of one of the values of the diaphragm scale 22 to the index 21 will move into the range of the deflection cam 48. It will be obvious that the cam portions corresponding to small diaphragm apertures, as for instance $f{:}22$ or $f{:}16$, extend closely toward the optical axis, while the cam portions corresponding to larger diaphragm apertures, as for instance $f:2$, $f:2.8$ or $f:4$, recede from the optical axis so that the scanning pin 33 will be pushed down with the setting of small diaphragm values and will be raised when large diaphragm values are set. This means that the scanning lever 34 at a diaphragm aperture of $f:22$ performs its maximum rotation about the shaft 56 in counterclockwise direction which corresponds to the longest return run of the diaphragm cage 4 in clockwise direction upon release of the camera. Thus the diaphragm is closed down to its smallest aperture. Conversely, with the setting of larger diaphragm values a proportional increased rotation of the scanning lever 34 in clockwise direction will take place which has the effect that the diaphragm cage upon release of the camera is capable of no return run at all or only of one of negligible duration so that the diaphragm remains fully or almost fully open. An influencing of the scanning lever 34 for the manual diaphragm formation by the two other scanning levers 37 and 47, respectively, is precluded because the lever 37 has been rendered inoperative by the action of the cam 51, 52, and the lever 47 has become ineffective by means of the cam 64.

If the front lens 90 of the camera objective is removed, the scanning pin 65 and the coupling rod 68 remain on the camera and, when another front lens is attached, are automatically operatively connected with the distance deflecting cam 3 and the coupling slot 168 of this other lens.

Figure 2:
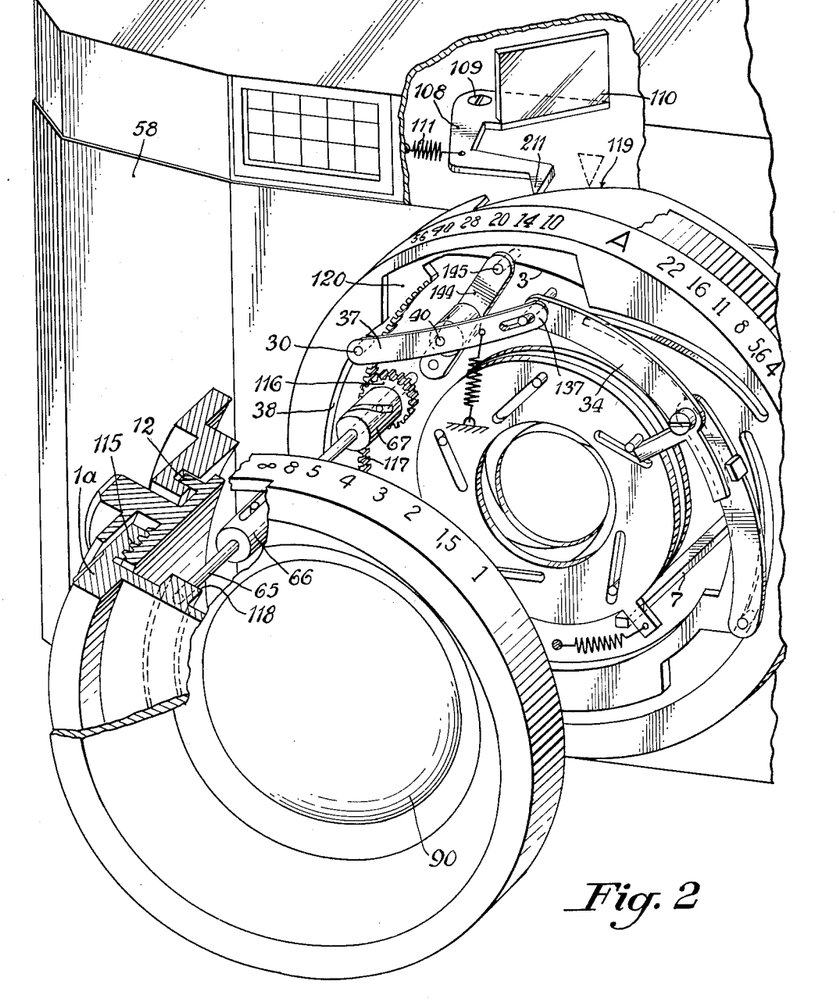
FIG. 2 illustrates a camera which is a modification of the one shown in FIG. 1.

FIG. 2 illustrates a different embodiment of the invention which has, however, in common with that of FIG. 1 that only a part of the objective together with the distance adjustment means is exchanged, and that the deflecting, scanning and setting means of the remaining automatic flash exposure structure remain on the camera. Different from the embodiment of FIG. 1 is the feature that the distance setting means and the distance transfer means are arranged on the front member 90, wherein like in FIG. 1 the distance adjusting motions of the front member 90 are conducted toward the rear into the camera body for the purpose of introducing the adjusted distance value into the automatic flash exposure mechanism and, diverging therefrom, into the place of the range finder mirror. The numeral 1a refers to the distance adjusting ring now arranged with its adjusting thread 115 on the front member. The front member 90, to be attached at 12 to the objective mount, has arranged thereon a lifting cam 118 which is so shaped that it induces an axial displacement of the scanning pin 65 in accordance with the distance adjustment.

The sleeve 67 which converts the axial displacements of the scanning pin 65 into rotative adjustments, has attached thereto a pinion 116 which is in engagement with inner gear teeth 117 on an auxiliary ring 120. This auxiliary ring 120 is provided with deflecting cams 3 and 119 on its inner circumference. The cam 3 simultaneously acts as a deflecting cam and as a compensating cam for the purpose of mutual adaptation to the intervals on the distance scale and the other scales and is in cooperation with a lever 144 whose axis of rotation 40 is supported by the guide number scanning lever 37. As in the embodiment of FIG. 1, the sum of the adjustments of guide number and distance is reflected by the position of the end 137 of the lever 37 which transfers this result to the lever 34 and therewith ultimately to the diaphragm mechanism.

The bell crank lever 108 which is rotatable about 109 and carries the movable range finder mirror 110, is pulled by the spring 111 against the deflection cam 119 and engages it with the scanning end 211.

The operation of the distance scanning in combination with the motion of the reflecting surface 110 is as follows:

Suppose the lifting cam 118 protrudes farther toward the interior of the camera when small distance values have been set so that with the selection of small distance values the scanning pin 65 is axially displaced toward the interior of the camera and the sleeve 67 performs a counterclockwise rotation. The auxiliary ring 120 is taken along in the same direction and by means of its cam 119 causes the bell crank lever 108 to make a counterclockwise turn about the shaft 109 which results in a corresponding tilting of the reflecting surface 110.

When the front member 90 is replaced by another one, the operation is such that upon removal of the member 90 (opening of the bayonet 12) only the scanning pin 65 is retained on the camera as a transfer part which upon attachment of the other front member engages the lifting cam 118 of the same. The effectiveness of this arrangement may be further improved by resilient means or the like. The scanning of the guide number cam 38 and of the distance cam 3 by the levers 37 and 144 and the feeding of the scanning result into the diaphragm mechanism corresponds to that of the embodiment of FIG. 1 and requires no repetition.

Figure 3:
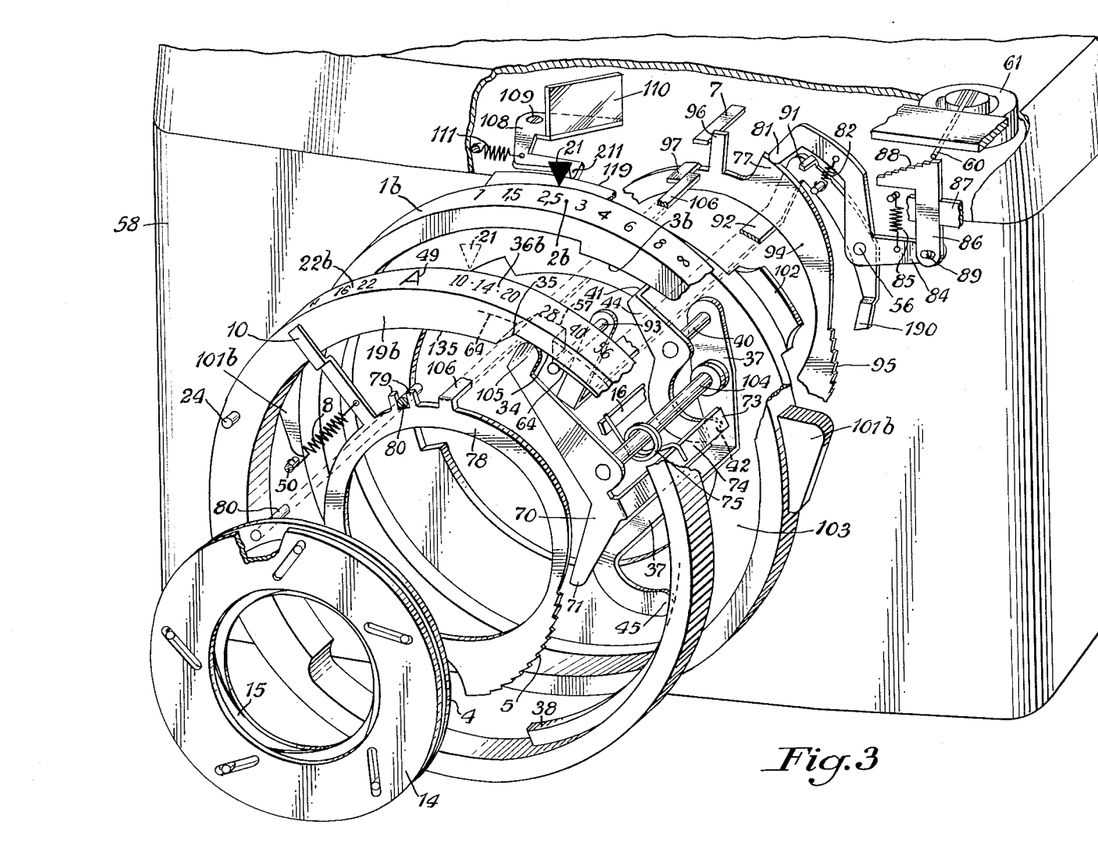
FIG. 3 illustrates a camera of the invention in which the entire camera objective is exchangeable.

In the embodiment of the invention illustrated in FIG. 3 the camera casing 58 is equipped with a built-in exposure meter for the automatic exposure mechanism, the pointer 60 of which is scanned by the scanning device 81 to 89. Furthermore, there is provided an intermediate ring 94 connectable with the diaphragm mechanism of a completely interchangeable objective, and a catch member 190 which together with the scanning device 81 to 89 is arranged on a common shaft 56 and which cooperates with a series of abutment steps provided on the intermediate ring 94. This catch member 190 is controlled by the scanning device 81 to 89 in a manner to be closer described hereinafter and has a lateral projection 92 extending forwardly and into the objective. A scanning pin 93 on this projection 92 cooperates with connecting and disconnecting cams 57 and 64, respectively, on the actuating ring 19.

The scanning device of the automatic exposure mechanism consists substantially of a bell crank lever 84 rotatable about the axis of the shaft 56 and one end of which is connected at 89 by a pin-slot connection with a plate 86 which is vertically slidable in a fixed guide 87. The plate 86 has at its upper end a series of steps 88 which cooperate with the pointer 60 of the measuring instrument 61 of the exposure meter. Obviously, there is provided a clamping device for the pointer which, being known, is not disclosed in detail. A spring 85 causes at the right moment, i.e. when the camera is released, an upward movement of the plate 86 toward the pointer 60. The other upper end of the bell crank lever 84 terminates in a scanning nose 81 which cooperates with a projection or cam 77 on the intermediate ring 94. The intermediate ring 94 is further provided with a radial arm 96 which is blocked by a shutter controlled locking member 7 when the camera is tensioned. This means that when the camera is tensioned the intermediate ring 94 is arrested in a position which corresponds to an extreme aperture, preferably to the position of the largest diaphragm aperture, of the diaphragm mechanism 4, 14, 15. The intermediate ring 94 is provided with another lateral arm 97 which is in cooperation with an axially extending counter arm 106 arranged on the intermediate ring 78 of the objective. This last mentioned ring 78 in turn is connected by a coupling 79, 80 with the diaphragm mechanism 4, 14, 15. In addition, the radial arm 10 on the ring 78 is engaged by the spring 8 which is attached between the points 9 and 50 and seeks to let the diaphragm mechanism run back toward a closing of the diaphragm when the camera is released and therewith the effect of the locking member 7 is removed.

When the camera is tensioned, the scanning nose 81 engages the cam 77 on the intermediate ring 94. This means that also when the operating range of the automatic exposure mechanism is connected, i.e. when the control pin 93 engages the recess 57, the scanning device 81 to 89 is blocked and the instrument pointer 60 can move into a position which corresponds to the prevailing light conditions. When the camera is released, the intermediate rings 94 and 78 and the rotatable diaphragm cage 4 commence to run off in counter-clockwise direction which causes the scanning nose 81 to leave the cam 77. The scanning device 81 to 89 is now able to scan the pointer 60.

Between the bell crank lever 84 and the catch member 190 is arranged an additional spring 82 which ensures a good engagement of the coupling projection 91 and the oppositely positioned surface of the bell crank lever 84 when the camera is released. Due to this spring coupling the catch member 190 follows the movements of the scanning device and places itself opposite the abutment steps 95 in accordance with the end positions determined by the scanning device. Upon release of the camera one of the steps of the series of abutment steps 95 after a longer or shorter return run of the intermediate ring 94 will come into engagement with the catch member 190 depending upon the position of the same. This means that in agreement with the prevailing and measured light value the correct diaphragm aperture has been automatically formed.

The lateral arm 97 on the intermediate ring 94 is so arranged that upon attaching the interchangeable objective by means of the bayonet projections 102 arranged on the mount 103 the said arm 97 will be in a coupling position with respect to the arm 106 on the objective when the camera is tensioned. The lateral arm 92 which is arranged on the catch member 190 and extends forward engages during this attachment procedure with its control pin 93 the cams on the actuating ring 19b.

The interchangeable lens system is provided with two adjustment elements, namely a distance adjusting ring 1b having the distance scale 2b thereon and the actuating ring 19b which at the most carries two circumferentially in series arranged different scales and a mark for the adjustment to the range of the automatic exposure mechanism. The first one of these two scales is the diaphragm scale 22b representing the operating range of the manual setting or preselection of the diaphragm, and the second scale is the guide number scale 36b representing the operating range of the automatic flash exposure. Between these two scales is arranged the mark 49 consisting of an A for the operating range of the automatic exposure. All scales and marks have the common index 21. It is understood that the rings 1b and 19b which in the drawing are deliberately shown axially spaced apart, are in practice arranged closely adjacent to each other in order to facilitate the adjustment of the exposure factors with respect to the one common index. With 101b are designated the handles on the distance adjusting ring 1b.

The distance adjusting ring 1b is provided on its inner circumference with a control cam 3b which deflects the scanning lever 44 with its scanning surface 41 in accordance with the adjusted distance values. It is apparent that the cam 3b, when small distance values are adjusted, projects farther toward the interior of the objective and vice versa. Finally it may be pointed out that this cam 3b is constructed in such a manner that it is able to compensate for the existing differences in the characteristics of the distance adjusting mechanism and the diaphragm mechanism. If small distance values are adjusted, the scanning surface 41 of the scanning lever 44 descends more toward the optical axis and the scanning lever performs a rotative movement in counterclockwise direction. The axis of rotation of the scanning lever 44 is designated with 40. The scanning lever 44 is in coupling connection with a catch member 70 by means of the coupling surface 73 provided in the projection 74 of the catch member 70 and the lever end 42 of the lever 44. A spring 75, whose one end presses upon the projection 74 while its other end is fastened to the stationary part 16, affords a good coupling position between 42 and 73. The spring 75 is wound about the shaft 104 which also forms the axis of the catch member 70.

The distance setting ring 1b is provided in addition to the cam 3b also with a deflecting cam 119 which is in cooperation with the scanning end 211 of the bell crank lever 108 carrying the range finder reflecting surface 110. The other illustrated details of this mirror support correspond to those of the FIGS. 1 and 2 and their operating is identical.

If upon adjustment of small distance values the scanning lever 44 performs a counterclockwise rotation, the catch member 70 follows and, correspondingly, its catch tooth 71 moves away from the abutment steps 5 on the intermediate ring 78. Consequently, when the camera is released the diaphragm mechanism is able to perform a longer lasting return run before it comes to an engagement between the steps 5 and the tooth 71. The diaphragm, therefore, is closed to a larger extent. The catch member 70 consists of a bell crank lever which is supported by the previously mentioned shaft 104 and one end of which forms a scanning nose 105 for the connecting and disconnecting cams 34, 35 on the actuating ring 19b. The drawing shows by way of example, and as will be seen also from the position of the guide number 10 opposite the index 21, the range of the automatic flash exposure mechanism in operation. If the camera is now switched from the operating range of the automatic flash exposure to another operating range, the scanning nose 105 over the ascending cam portion 35 will come into engagement with the disconnecting surface 135 with the result that the catch member 70 assumes such a rotary position that an engagement of its catch tooth 71 with the abutment steps 5 is made impossible.

The lever of the automatic flash exposure mechanism which scans the guide number cam 38 is designated with 37. The end 45 of this intermediate element having again the shape of a bell crank lever is in engagement with the cam 38 which when small guide numbers are adjusted recedes toward the outer periphery of the ring 19b and which for higher guide numbers is provided with a projection in its inner circumference. This means that when high guide numbers are adjusted the scanning lever 37 loosely rotatable on the shaft 104 performs a clockwise rotation.

The transfer of this movement to the catch member 70 is not a direct one but is carried out via the scanning lever 44, the lower end 42 of which establishes the only coupling connection with the catch member 70. This indirect transfer of the scanning motions of the scanning lever 37 to the catch member 70 takes place by means of the shaft 40 of the scanning lever 44, which shaft 40 is supported by the lever 37. If now the lever 37 performs a clockwise rotation following the adjustment of high guide numbers, the lever 44 which at 41 engages the cam 3b performs a counterclockwise rotation which in turn causes a lifting of the catch tooth 71 of the catch member 70 from the abutment steps 5. Therefore, also when high guide numbers are adjusted a longer lasting return run of the diaphragm mechanism is possible before an engagement between the catch tooth 71 and the abutment steps 5 takes place.

The actuating ring 19b is provided with a stop pin 24 which becomes effective in the operating range of the manual diaphragm setting and preselection, respectively. The already mentioned radial arm 10 on the ring 78 is of such a shape that it serves as an abutment for the stop pin 24 arranged on the actuating ring 19b. These two stops effect the manual diaphragm setting. The stop 24 represents the preselection stop in the range of the manual diaphragm setting. With a diaphragm aperture of f:22 it is in the most distant position from the abutment stop 10 which means that upon release of the camera the rings 78 and 4 are able to perform the longest possible return run. Contrary, when the largest diaphragm aperture has been adjusted, the return run is the shortest.

The operation of the camera and the objective, respectively, in the individual operating ranges is now easily explained. If the operating range of the automatic exposure mechanism is adjusted by moving the mark "A" 49 opposite the index 21, the scanning device 81 to 89 is prevented from becoming effective because the scanning nose 81 of the projection 77 is in blocking engagement with the intermediate ring 94 as long as the camera is tensioned. Upon release of the camera the scanning device is freed, the plate 86 carrying the steps 88 jumps upward by the action of the spring 85 and depending upon the position of the pointer 60 comes after a short or long movement to rest against the pointer. Depending upon the abutment position between the pointer 60 and the steps 88 the catch member 190 will assume a corresponding distance or angular position, respectively, with respect to the abutment steps 95. The rings 94, 78 and 4 released by the moving away of the locking member 7 perform a return run due to the action of the spring 8 until the catch member 190 comes into engagement with the abutment steps 95. With the retensioning of the camera the abutting connections between 190 and 95 and between 60 and 88 are separated because the intermediate ring 94 by the return of the locking member 7 has assumed the illustrated position and the nose 81 again has moved up onto the projection 77. With the release of the camera the cycle starts anew.

If the operating range of the automatic flash exposure is adjusted, the control pin 93 moves out of the connecting recess 57 and by engaging the disconnecting projection 64 and lifting the catch member 190 from the steps 95 prevents a formation of the diaphragm in dependence of the automatic exposure mechanism. The scanning nose 105 of the catch member 70 of the automatic flash exposure mechanism has moved from the disconnecting projection 135 into the connecting recess 134 so that the individual elements of the automatic flash exposure mechanism are no longer blocked. It has been said before that an adjustment of small as well as of high guide numbers causes the catch tooth 71 to move away from the abutment steps 5 arranged on the intermediate ring 78. The adjustment of large distance values and small guide numbers, respectively, obviously would cause a clockwise rotation of the catch member 70 and thus an approaching of the abutment steps 5 by the catch tooth 71. This means that when small distance values and high guide number values are selected, the diaphragm upon release of the camera is accordingly closed more, while it remains fully or approximately fully open when large distance values and low guide number values are selected.

When the camera is switched to the operating range of the manual diaphragm setting, both automatic exposure mechanisms are blocked by the engagement of the control pin 93 with the disconnecting cam 64, and by the engagement of the scanning nose 105 with the disconnecting projection 135, so that the camera can be operated in conventional manual manner. Depending upon the adjusted diaphragm value the distance between the stop pin 24 and the radial arm 10 will be decreased or increased so that upon release of the camera and the ensuing longer or shorter return run of the diaphragm mechanism and the rings connected therewith the elements involved will come into engagement, thus forming the desired and adjusted diaphragm aperture.

What I claim is:

1. A photographic camera provided with a camera objective and with a rotatably mounted actuating ring which extends concentrically about the optical axis of said camera, said ring being provided with scales, marks and deflecting cams which are adapted to adjust the camera, depending upon the rotative position of the actuating ring, to an automatic flash exposure operating range, an automatic exposure range and a manually adjustable diaphragm operating range, including (a) a camera objective provided with a detachable front lens system,
(b) a built-in range finder provided with a movable optical deflecting member,
(c) a distance adjusting means operatively connected with the detachable front lens system of said camera objective, and
(d) means for operatively connecting said distance adjusting means with said movable deflecting member and with said automatic flash exposure mechanism,
(e) said distance adjusting means including a distance adjusting member which forms a part of said detachable front lens system and is removed with the latter when the same is detached from the camera objective (FIGS. 1 and 2),
(f) said distance adjusting member comprising a cam provided on the amount of said detachable front lens system, said cam being provided for axially displacing a control pin arranged in said camera objective and extending parallel to the optical axis thereof, and
(g) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value.

2. A photographic camera provided with a camera objective and with a rotatably mounted actuating ring which extends concentrically about the optical axis of said camera, said ring being provided with scales, marks and deflecting cams which are adapted to adjust the camera depending upon the rotative position of the actuating ring to an automatic flash exposure operating range, an automatic exposure range and a manually adjustable diaphragm operating range, including (a) a camera objective provided with a detachable front lens system,
(b) a built-in range finder provided with a movable optical deflecting member,
(c) a distance adjusting means operatively connected with the detachable front lens system of said camera objective, and
(d) means for operatively connecting said distance adjusting means with said movable deflecting member and with said automatic flash exposure mechanism,
(e) said distance adjusting means including a distance adjusting member which forms a part of said detachable front lens system and is removed with the latter when the same is detached from the camera objective (FIGS. 1 and 2),
(f) said distance adjusting member comprising a cam provided on the mount of said detachable front lens system, said cam being provided for axially displacing a control pin arranged in said camera objective and extending parallel to the optical axis thereof, and
(g) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value,
(h) said cam forming a deflection cam and a compensating cam for providing a linear course of the different intervals of a distance scale arranged on the mount of said detachable front lens system.

3. A photographic camera provided with a camera objective and with a rotatably mounted actuating ring, which extends concentrically about the optical axis of said camera, said ring being provided with scales, marks and deflecting cams which are adapted to adjust the camera, depending upon the rotative position of the actuating ring, to an automatic flash exposure operating range, an automatic exposure range and a manually adjustable diaphragm operating range, including (a) a camera objective provided with a detachable front lens system, (b) a built-in range finder provided with a movable optical deflecting member, (c) a distance adjusting means operatively connected with the detachable front lens system of said camera objective, (d) means for operatively connecting said distance adjusting means with said movable deflecting member and with said automatic flash exposure mechanism, (e) said distance adjusting means including a distance adjusting member which forms a part of said detachable front lens system and is removed with the latter when the same is detached from the camera objective (FIGS. 1 and 2)

(f) said distance adjusting member comprising a cam provided on the mount of said detachable front lens system, said cam being provided for axially displacing a control pin arranged in said camera objective and extending parallel to the optical axis thereof, (g) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value, and (h) means for causing said axially displacable control pin to perform a rotative movement when axially displaced.

4. A photographic camera provided with a camera objective and with a rotatably mounted actuating ring which extends concentrically about the optical axis of said camera, said ring being provided with scales, marks and deflecting cams which are adapted to adjust the camera, depending upon the rotative position of the actuating ring, to an automatic flash exposure operating range, an automatic exposure range and a manually adjustable diaphragm operating range, including (a) a camera objective provided with a detachable front lens system, (b) a built-in range finder provided with a movable optical deflecting member, (c) a distance adjusting means operatively connected with the detachable front lens system of said camera objective, (d) means for operatively connecting said distance adjusting means with said movable deflecting member and with said automatic flash exposure mechanism, (e) said distance adjusting means including a distance adjusting member which forms a part of said detachable front lens system and is removed with the latter when the same is detached from the camera objective (FIGS. 1 and 2), (f) said distance adjusting member comprising a cam provided on the mount of said detachable front lens system, said cam being provided for axially displacing a control pin arranged in said camera objective and extending parallel to the optical axis thereof, (g) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value.

(h) means for causing said axially displaceable control pin to perform a rotative movement when axially displaced, and (i) an intermediate ring arranged concentrically about the optical axis of said camera objective, said ring forming a carrier for said optical deflecting member and being rotatably adjusted when said control pin is rotated.

5. A photographic camera provided with a camera objective and with a rotatably mounted actuating ring which extends concentrically about the optical axis of said camera, said ring being provided with scales, marks, and deflecting cams which are adapted to adjust the camera, depending upon the rotative position of the actuating ring, to an automatic flash exposure operating range, and automatic exposure range and a manually adjustable diaphragm operating range, including (a) a camera objective provided with a detachable front lens system (b) a built-in range finder provided with a movable optical deflecting member, (c) a distance adjusting means operatively connected with the detachable front lens system of said camera objective, (d) means for operatively connecting said distance adjusting means with said movable deflecting member and with said automatic flash exposure mechanism, (e) said distance adjusting means including a distance adjusting member which forms a part of said detachable front lens system and is removed with the latter when the same is detached from the camera objective (FIGS. 1 and 2), (f) said distance adjusting member comprising a cam provided on the mount of said detachable front lens system, said cam being provided for axially displacing a control pin aranged in said camera objective and extending parallel to the optical axis thereof, (g) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value.

(h) means for causing said axially displaceable control pin to perform a rotative movement when axially displaced, and (i) an intermediate member forming a carrier for said optical deflecting member and being adjusted when said control pin is rotated.

6. A photographic camera provided with a camera objective and with a rotatably mounted actuating ring which extends concentrically about the optical axis of said camera, said ring being provided with scales, marks, and deflecting cams which are adapted to adjust the camera, depending upon the rotative position of the actuating ring, to an automatic flash exposure operating range, and automatic exposure range and a manually adjustable diaphragm operating range, including (a) a built-in range finder provided with a movable deflecting member, (b) a distance adjusting means operatively connected with said camera objective, (c) means for operatively connecting said distance adjusting means with said movable deflecting member and with said automatic flash exposure mechanism, (d) means for causing said operative connection with said automatic flash exposure mechanism to be removed with said detachable camera objective, and (e) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value.

7. A photographic camera provided with a camera objective and with a rotatably mounted actuating ring which extends concentrically about the optical axis of said camera, said ring being provided with scales, marks, and deflecting cams which are adapted to adjust the camera, depending upon the rotative position of the actuating ring, to an automatic flash exposure operating range, and automatic exposure range and a manually adjustable diaphragm operating range, including (a) a built-in range finder provided with a movable deflecting member,
(b) a distance adjusting means operatively connected with said camera objective,
(c) means for operatively connecting said distance adjusting means with said movable deflecting member and with said automatic flash exposure mechanism,
(d) an actuating ring extending concentrically about the optical axis of said camera objective and adapted to adjust the camera selectively to either one of said plurality operating ranges,
(e) means for causing said operative connection with said automatic flash exposure mechanism and said actuating ring to be removed with said detachable camera objective, and
(f) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value.

8. A photographic camera provided with a camera objective and with a rotatably mounted actuating ring, which extends concentrically about the optical axis of said camera, said ring being provided with scales, marks and deflecting cams which are adapted to adjust the camera, depending upon the rotative position of the actuating ring, to an automatic flash exposure operating range, an automatic exposure range and a manually adjustable diaphragm operating range, including (a) a built-in range finder provided with a movable deflecting member,
(b) a distance adjusting means operatively connected with said camera objective,
(c) means for operatively connecting said distance adjusting means with said movable deflecting member and with said automatic flash exposure mechanism, said distance adjusting means comprising a distance adjusting ring which is arranged concentrically about the optical axis of said camera objective and carries pivotally thereon deflecting members for actuating said movable deflecting member of said range finder, and
(d) a double branch connection extending from said control pin to the camera, one branch of which influences a member of the automatic flash exposure mechanism in dependence of the adjusted distance, while the other branch adjusts the movable deflecting member of the built-in range finders in accordance with the adjusted distance value.

References Cited by the Examiner

UNITED STATES PATENTS 2,805,609  10/1957  Nerwin ______________ 95—44
3,040,641  6/1962  Bates _______________ 95—11.5

JOHN M. HORAN, *Primary Examiner.*